US012768940B2

(12) United States Patent
Zhang et al.

(10) Patent No.: US 12,768,940 B2
(45) Date of Patent: Oct. 20, 2026

(54) SIGNAL PROCESSING METHOD AND DEVICE, RADAR, MEDIUM, PROGRAM PRODUCT AND TERMINAL

(71) Applicant: CALTERAH SEMICONDUCTOR TECHNOLOGY (SHANGHAI) CO., LTD., Shanghai (CN)

(72) Inventors: Lei Zhang, Shanghai (CN); Yi Chen, Shanghai (CN); Xiao Wang, Shanghai (CN); Lanfeng Dai, Shanghai (CN); Yige Cheng, Shanghai (CN); Zengyu Yu, Shanghai (CN); Yi Ma, Shanghai (CN); Tongyu Zhu, Shanghai (CN)

(73) Assignee: Calterah Semiconductor Technology (Shanghai) Co., Ltd., Shanghai (CN)

( * ) Notice: Subject to any disclaimer, the term of this patent is extended or adjusted under 35 U.S.C. 154(b) by 261 days.

(21) Appl. No.: 18/399,665

(22) Filed: Dec. 28, 2023

(65) Prior Publication Data

US 2024/0345213 A1 Oct. 17, 2024

Related U.S. Application Data

(63) Continuation of application No. PCT/CN2023/104114, filed on Jun. 29, 2023.

(30) Foreign Application Priority Data

Jul. 11, 2022 (CN) ......................... 202210813029.6
Jun. 8, 2023 (CN) ......................... 202310682168.4

(51) Int. Cl.
*G01S 7/35* (2006.01)
*G01S 13/58* (2006.01)

(52) U.S. Cl.
CPC ............ *G01S 7/354* (2013.01); *G01S 13/584* (2013.01)

(58) Field of Classification Search
CPC ...... G01S 13/931; G01S 13/584; G01S 13/48; G01S 2013/0254; G01S 7/354
(Continued)

(56) References Cited

U.S. PATENT DOCUMENTS 10,983,204 B2 * 4/2021 Kim ........................ G01S 13/34
11,184,076 B2 * 11/2021 Choi .................. H04L 27/2601
(Continued)

FOREIGN PATENT DOCUMENTS

CN 109917340 A 6/2019
CN 110133630 A 8/2019
(Continued)

OTHER PUBLICATIONS

Calterah Semiconductor Technology (Shanghai) Co., Ltd., European Search Report, EP23825186.2, Sep. 22, 2025, 17 pgs.
(Continued)

*Primary Examiner* — Michael W Justice
(74) *Attorney, Agent, or Firm* — USCH Law, PC

(57) ABSTRACT

The disclosed are a signal processing method, a signal processing device, a radar, a medium, a program product and a terminal. The method is applied to the radar, the radar includes M transmit channels, and the method includes: transmitting, during a first transmit cycle, a first detection signal through the M transmit channels; transmitting, during a second transmit cycle, a second detection signal through m1 transmit channels in the M transmit channels, where m1<M, M is an integer greater than 0; and processing a first echo signal and a second echo signal to determine a correspondence between the first echo signal and the M transmit channels; where the first echo signal and the second echo signal are signals generated after the first detection signal
(Continued)

and the second detection signal being reflected by a target, respectively. It is advantageous to better meet the radar measurement needs.

20 Claims, 6 Drawing Sheets

(58) Field of Classification Search
USPC ............................ 342/70, 117, 157, 118, 107
See application file for complete search history.

(56) References Cited

U.S. PATENT DOCUMENTS

| | | | | |
|---|---|---|---|---|
| 11,194,040 | B2 * | 12/2021 | Li | G01S 7/023 |
| 12,111,387 | B2 * | 10/2024 | Zhou | G01S 13/003 |
| 12,111,417 | B2 * | 10/2024 | Schindler | G01S 7/0234 |
| 12,306,336 | B2 * | 5/2025 | Lombardo | G01S 7/4017 |
| 12,313,768 | B2 * | 5/2025 | Zhu | G01S 7/2883 |
| 12,517,217 | B2 * | 1/2026 | Lao | G01S 13/325 |
| 2019/0361105 | A1 * | 11/2019 | Kim | G01S 13/343 |
| 2020/0025914 | A1 * | 1/2020 | Li | G01S 13/878 |
| 2020/0150260 | A1 | 5/2020 | Lang et al. | |
| 2021/0091840 | A1 * | 3/2021 | Choi | H04L 25/0216 |
| 2022/0035019 | A1 * | 2/2022 | Zhou | G01S 13/003 |
| 2022/0236375 | A1 * | 7/2022 | Lombardo | G01S 7/40 |
| 2022/0244348 | A1 * | 8/2022 | Schindler | G01S 13/325 |
| 2023/0092131 | A1 * | 3/2023 | Lao | G01S 13/325<br>342/200 |
| 2023/0184886 | A1 * | 6/2023 | Zhu | G01S 13/42<br>342/196 |

FOREIGN PATENT DOCUMENTS

| | | | | | |
|---|---|---|---|---|---|
| CN | 110221291 | A | | 9/2019 | |
| CN | 111257846 | A | | 6/2020 | |
| CN | 112740069 | A | | 4/2021 | |
| CN | 113109785 | A | | 7/2021 | |
| CN | 113777577 | A | | 12/2021 | |
| CN | 114488154 | A | | 5/2022 | |
| CN | 114706066 | A | | 7/2022 | |
| EP | 4148451 | A1 | * | 3/2023 | G01S 13/931 |
| EP | 4184797 | A1 | | 5/2023 | |
| WO | 2021243491 | A1 | | 12/2021 | |
| WO | 2021258292 | A1 | | 12/2021 | |
| WO | 2022051992 | A1 | | 3/2022 | |

OTHER PUBLICATIONS

Meng Zhaochen, Study of Sea Surface Targets Imaging Based On Hybrid SAR/ISAR Processing, China Excellent Master's Thesis Full-text Database, Mar. 15, 2014, 63 Pgs.
Calterah Semiconductor Technology (Shanghai) Co., Ltd., CN First Office Action with English Translation, CN 2023106821684, Jun. 3, 2026, 9 Pgs.

* cited by examiner

SIGNAL PROCESSING METHOD AND DEVICE, RADAR, MEDIUM, PROGRAM PRODUCT AND TERMINAL

CROSS REFERENCE TO RELATED APPLICATIONS

This application is a continuation of PCT Patent Application No. PCT/CN2023/104114, filed Jun. 29, 2023, which claims priority to Chinese Patent Application No. 202210813029.6 filed on Jul. 11, 2022 and No. 202310682168.4 filed on Jun. 8, 2023, each of which is incorporated by reference herein in its entirety.

TECHNICAL FIELD

The various embodiments described in this document relate in general to the technical field of radar, and more specifically to a signal processing method, a signal processing device, a radar, a readable storage medium, a computer program product and a terminal.

BACKGROUND

An angle resolution, an angle accuracy and an angle robustness index of a radar are directly related to the number of receive channels and an aperture of the radar. Due to the limitation of a radar size and the number of physical transmit/receive channels of a millimeter wave radar chip, a multiple-input multiple-output (MIMO) radar is generally used to extend the number of the receive channels and the aperture.

Signal processing methods of the MIMO radar include a time-division-multiplexing (TDM)-based signal processing method, a Doppler-division-multiplexing (DDM)-based signal processing method, etc. from a perspective that transmitted detection signals are different.

However, currently, the signal processing methods of the MIMO radar achieved based on various multiplexing have their own drawbacks and cannot well meet radar measurement requirements.

SUMMARY

Embodiments of the present disclosure provide a signal processing method, a signal processing device, a radar, a readable storage medium, a computer program product and a terminal, which are advantageous to better meet radar measurement requirements.

Some embodiments of the present disclosure provide a signal processing method, applied to a radar. The radar includes M transmit channels. The method includes: transmitting, during a first transmit cycle, a first detection signal through the M transmit channels; transmitting, during a second transmit cycle, a second detection signal through m1 transmit channels in the M transmit channels, where m1<M and M is an integer greater than 0; processing a first echo signal and a second echo signal to determine a correspondence between the first echo signal and the M transmit channels; where the first echo signal and the second echo signal are signals generated after the first detection signal and the second detection signal being reflected by a target, respectively.

In some embodiments, transmitting the first detection signal through the M transmit channels includes: transmitting the first detection signal with pulses phase-stepped by $$(e-1)*\frac{2*\pi}{M}$$

through an eth transmit channel in the M transmit channels, where $e \in \{1,2,3, \ldots, M\}$.

In some embodiments, processing the first echo signal and the second echo signal to determine the correspondence between the first echo signal and the M transmit channels includes: performing a first processing on the first echo signal to obtain a first target data, performing a second processing on the second echo signal to obtain a second target data, performing a matching processing on the first target data and the second target data, and determining the correspondence between the first echo signal and the M transmit channels based on a matching result.

In some embodiments, the first target data includes target point data $T_{AMT}(i)$ and the second target data includes target point data $T_{Am1T}(j)$, where $i \in \{1, \ldots, I_{AMT}\}$, $j \in \{1, \ldots, J_{AM1T}\}$, and both $I_{AMT}$ and $J_{Am1T}$ are positive integers. Performing the matching processing on the first target data and the second target data includes: searching for a respective one of the target point data $T_{AMT}(i)$ corresponding to each of the target point data $T_{AM1T}(j)$ among $I_{AMT}$ of the target point data $T_{AMT}(i)$, respectively.

In some embodiments, the target point data $T_{AMT}(i)$ includes a range unit data $k_{AMT}(i)$ and a velocity unit data $P_{AMT}(i)$ corresponding to the target, and the target point data $T_{Am1T}(j)$ includes a range unit data $k_{Am1T}(j)$ and a velocity unit data $p_{Am1T}(j)$ corresponding to the target. Searching for the respective one of the target point data $T_{AMT}(i)$ corresponding to each of the target point data $T_{Am1T}(j)$ among $I_{AMT}$ of the target point data $T_{AMT}(i)$ respectively, includes: determining a first weight value $W_R(i, j, q)$, a second weight value $W_V(i, j, q)$ and a third weight value $W_{RV}(i, j, q)$ according to the following formulas, respectively: $W_R(i, j, q)=|k_{AMT}(i)-k_{Am1T}(j)|$, $$W_V(i, j, q) = \left|\left(P_{AMT}(i) + q\frac{p_A}{M}\right) - p_{Am1T}(j)\right|,$$

$W_{RV}(i, j, q)=\partial \cdot W_R(i, j, q)+\beta \cdot W_V(i, j, q)$, where $\partial$ and $\beta$ are predetermined coefficients corresponding to the first weight value $W_R(i, j, q)$ and the second weight value $W_V(i, j, q)$ respectively, $p_A$ is a number of FFT points in a velocity gate, and q denotes a qth transmit channel corresponding to the target point data $T_{AMT}(i)$ to which the range unit data $k_{AMT}(i)$ and the velocity unit data $P_{AMT}(i)$ belong, among the M transmit channels. The first weight value $W_R(i, j, q)$, the second weight value $W_V(i, j, q)$ and the third weight value $W_{RV}(i, j, q)$ correspond to predetermined decision thresholds $TH_R$, $TH_V$, $W_{min}(i)$ respectively, and whether the target point data $T_{AMT}(i)$ matches with the target point data $T_{Am1T}(j)$ is determined according to the following conditions: $W_R(i, j, q)<TH_R$, $W_V(i, j, q)<TH_V$, $W_{RV}(i, j, q)<W_{min}(i)$. In response to the conditions satisfied, it is determined that the target point data $T_{AMT}(i)$ matches with the corresponding target point data $T_{Am1T}(j)$ or in response to the conditions not satisfied, it is determined that the target point data $T_{AMT}(i)$ does not match with the corresponding target point data $T_{Am1T}(j)$.

In some embodiments, after searching for the respective one of the target point data $T_{AMT}$ corresponding to each of the target point data $T_{Am1T}(j)$ among $I_{AMT}$ of the target point data $T_{AMT}(i)$ respectively, determining the correspondence between the first echo signal and the M transmit channels based on the matching result, includes: determining, based on the correspondence between the target point data $T_{AMT}(i)$ and the target point data $T_{Am1T}(j)$, a transmit channel corresponding to the m1 transmit channel in the M transmit channels; and determining, based on the transmit channel corresponding to the m1 transmit channel in the M transmit channels, the correspondence between the first echo signal and the M transmit channels.

In some embodiments, the method further includes: after determining the correspondence between the first echo signal and the M transmit channels based on the matching result, correcting the first target data according to the correspondence between the first echo signal and the M transmit channels to obtain a third target data.

In some embodiments, m1 is equal to 1 and the m1 transmit channels for transmitting the second detection signal include a first transmit channel. Determining, based on the correspondence between the target point data $T_{AMT}(i)$ and the target point data $T_{Am1T}(j)$, the transmit channel corresponding to the m1 transmit channels in the M transmit channels, includes: determining, based on the correspondence between the target point data $T_{AMT}(i)$ and the target point data $T_{Am1T}(j)$, a second transmit channel corresponding to the first transmit channel in the M transmit channels. Correcting the first target data according to the correspondence between the first echo signal and the M transmit channels to obtain the third target data, includes: correcting the first target data according to a position of the second transmit channel in the M transmit channels to obtain the third target data.

In some embodiments, the radar includes L physical receive channels, and the method further includes: performing a channel separation on the third target data to obtain target data corresponding to M*L virtual receive channels; and performing an angle measurement on the target based on the target data corresponding to the M*L virtual receive channels. Herein, L is an integer greater than 0.

In some embodiments, performing the first processing on the first echo signal to obtain the first target data includes: performing a channel separation on the first echo signal and obtaining the first target data based on a channel separation result.

In some embodiments, performing the angle measurement on the target includes: performing the angle measurement on the target by means of a Digital Beam Forming (DBF) algorithm or a Deterministic Maximum Likelihood (DML) algorithm.

In some embodiments, one or both of the first processing and the second processing includes a constant false alarm rate (CFAR) detection.

In some embodiments, one or both of the first processing and the second processing further includes at least one of the following processing: an analog-to-digital conversion (ADC), a 1D-discrete Fourier transform (for example, 1D-FFT), a 2D-discrete Fourier transform (2D-FFT) and a non-coherent integration (NCI).

In some embodiments, the first detection signal or the second detection signal is a frequency modulated continuous wave (FMCW) signal.

In some embodiments, the first detection signal is a TDM signal and the second detection signal is a DDM signal.

In some embodiments, a velocity ambiguity resolution is performed alternately based on the first echo signal and the second echo signal.

Some embodiments of the present disclosure provide a signal processing device, configured to perform the signal processing method as described in any one of the preceding items.

Some embodiments of the present disclosure provide a radar, including a transceiver and a processor. The transceiver includes at least one antenna, and is configured to transmit one or both of the first detection signal and the second detection signal as described in any one of the preceding items, and to receive one or both of the first echo signal and the second echo signal as described in any one of the preceding items. The processor is configured to perform the signal processing method as described in any one of the preceding items.

Some embodiments of the present disclosure provide a readable storage medium including a computer program or instructions. when the computer program or instructions are executed, the method as described in any one of the preceding items is implemented.

Some embodiments of the present disclosure provide a computer program product, including computer readable instructions, the computer readable instructions, when read and executed by a radar, cause the radar to implement the method as described in any one of the preceding items.

Some embodiments of the present disclosure provide a terminal including the radar as described above.

In some embodiments, the terminal includes a vehicle, a smart home device, or a smart robot.

The technical solutions provided by embodiments of the present disclosure have at least the following advantages.

Two types of detection signals, i.e., the first detection signal and the second detection signal, are provided, and the first detection signal and the second detection signal are transmitted through different periods and different numbers of channels. In this way, after reflection by the target, two types of echo signals, i.e., the first echo signal and the second echo signal, may be obtained. The second echo signal may be used to provide a reference for the first echo signal, so that the correspondence between the first echo signal and the M transmit channels transmitting the first detection signal can be accurately determined, which can provide more measurement information that is more accurate and is advantageous to better meet the radar measurement requirements.

DETAILED DESCRIPTION OF THE EMBODIMENTS

The present disclosure is described in further detail below in connection with the accompanying drawings and embodiments. It shall be understood that the specific embodiments described herein are only intended to explain the present disclosure, but not to limit the present disclosure. It should also be noted that, for the purpose of description, the accompanying drawings show only part relevant to the present disclosure rather than all of the structure.

In existing technologies, a transmit module of a radar generates a transmit waveform according to its configuration, and modulates the transmit waveform to a specified frequency band to generate a transmit signal. The transmit signal is sent to a transmit channel, the transmit channel radiates the transmit signal, and the transmit signal is reflected by a target to generate an echo signal. A receive channel may receive the echo signal and send the echo signal to a receive module. The receive module processes the received echo signal to obtain a baseband echo signal, a signal processing module performs a digital signal processing on the baseband echo signal, detects the target and estimates target parameters, and finally sends the target parameters to a tracking end for application layer processing. Herein, the radar described in the embodiments of the present disclosure may be a millimeter wave radar, and further, may be a multiple input multiple output (MIMO) millimeter wave radar.

Waveforms of existing MIMO radars include a DDM waveform, and such radars have a higher transmit power, a longer target detection range, and a larger range of unambiguous velocity, but the DDM waveform of the existing technologies adopt unequally spaced Doppler frequencies in order to be able to determine a transmit order of each of the transmit channels.

In summary, some embodiments of the present disclosure provide a signal processing method which may determine a transmit order of each of the transmit channels while employing the DDM waveform with an equally spaced Doppler frequency. In the method, a waveform of combination of a TDM waveform and the DDM waveform with the equally spaced Doppler frequency is designed to provide a matching method between the two waveforms, so as to achieve the determination of the transmit order of each of the transmit channels corresponding to the DDM waveform with the equally spaced Doppler frequency by the TDM waveform and further to improve accuracy of angle measurement of DDM radar with the equally spaced Doppler frequency.

Figure 1:
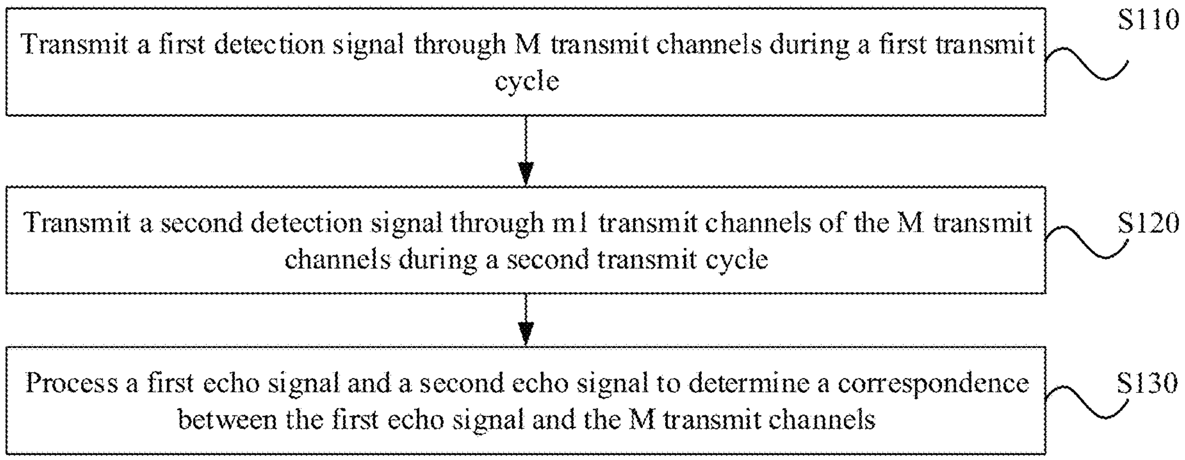
FIG. 1 is a brief flow diagram of a signal processing method according to an embodiment of the present disclosure.

Referring to FIG. 1, the signal processing method is applied to a radar including M transmit channels, and specifically includes the following operations.

In S110, a first detection signal is transmitted through the M transmit channels during a first transmit cycle.

In S120, a second detection signal is transmitted through m1 transmit channels in the M transmit channels during a second transmit cycle, where $m1<M$ and M is an integer greater than 0.

In S130, a first echo signal and a second echo signal are processed to determine a correspondence between the first echo signal and the M transmit channels. The first echo signal and the second echo signal are signals generated after the first detection signal and the second detection signal being reflected by the target, respectively.

In some embodiments, the first detection signal transmitted during the first transmit cycle may be a DDM signal, and the second detection signal transmitted during the second transmit cycle may be a TDM signal.

Based on this, in some embodiments, the DDM signal may also be an equally spaced DDM signal.

For the DDM signal, existing implementation is to transmit simultaneously through multiple transmit channels of the radar to overcome a problem of the TDM not being able to fully utilize the transmit channels. However, it is difficult to achieve the channel separation of the simultaneously transmitted DDM signals when receiving the echo signal. In order to solve this problem, existing solutions adopt a method of transmitting non-equally spaced DDM signals. However, the non-equally spaced DDM signals may affect a maximum unambiguous velocity of signal processing in turn.

In the above-mentioned embodiment, however, equally spaced DDM signals are provided to make the transmitted DDM signals no longer have frequency bias between them, i.e., transmitting equally spaced DDM signals, which in turn does not affect the maximum unambiguous velocity of the signal processing. And multiple virtual channels formed by channel separation of the TDM waveform in a time domain provide a reference for multiple virtual channels formed by channel separation of the DDM waveform in a Doppler frequency domain. That is, the embodiments of the present disclosure determine each of the transmit channels corresponding to a respective one of the DDM signals through the TDM signals, which solves the problem of determination of each of the transmit channels corresponding to a respective one of the equally spaced DDM waveforms, and facilitates improvement of the accuracy of channel separation of equally spaced DDM waveforms. Due to the absence of leakage effects and with a simple algorithm, a small calculation volume, a high matching rate and good robustness, the embodiments of the present disclosure can further improve the accuracy of the angle measurement of the DDM radar with the equally spaced Doppler frequency by improving the accuracy of the channel separation of the equally spaced DDM waveforms.

Herein, the TDM waveform described in the above-described embodiment may also be understood as a transmitted detection signal being the TDM signal. Similarly, the DDM waveform described in the above-described embodiment may also be understood as a transmitted detection signal being the DDM signal. In addition, the TDM waveform described in the above-described embodiment may also be expressed as a TDM-MIMO, a TDM-MIMO waveform, or a TDM-MIMO signal. Similarly, the DDM waveform described in the above-described embodiment may also be expressed as a DDM-MIMO, a DDM-MIMO waveform, or a DDM-MIMO signal.

As can be seen, in the above embodiment, the design that combines the TDM-MIMO waveform and the DDM-MIMO waveform, with the DDM-MIMO waveform designed with equal spacing, not only can use the TDM-MIMO waveform to provide a reference for the channel separation of the DDM-MIMO waveform, but also has the following advantages: (1) combining advantages of the TDM-MIMO and the DDM-MIMO, having a long detection range, no false alarms caused by leakage, fully utilizing the number of multiple input and output channels, high angle accuracy and resolution, and good robustness of angle measurement; and (2) the DDM-MIMO waveform with equal Doppler spacing is more robust than the DDM-MIMO waveform with non-equal spacing in CFAR detection, is not affected by leakage, and has no false alarm problem caused by leakage.

Both a sequential transmission relationship between the first detection signal and the second detection signal and a sequential processing relationship between the first echo signal and the second echo signal are not limited in the present disclosure. Exemplarily, the first detection signal may be transmitted first, followed by the second detection signal, or the second detection signal may be transmitted first, followed by the first detection signal. Alternatively, the first echo signal may be processed first, followed by the second echo signal, or the second echo signal may be processed first, followed by the first echo signal, which is not limited herein.

In some embodiments, the signal processing method provided by embodiments of the present disclosure may periodically alternate between transmitting the first detection signal and transmitting the second detection signal. For example, a periodic transmission may be carried out in an order like the first detection signal, the second detection signal, the first detection signal, the second detection signal, the first detection signal, the second detection signal, and so on. Further, for example, the periodic transmission may also be carried out in an order like the second detection signal, the first detection signal, the second detection signal, the first detection signal, the second detection signal, the first detection signal, and so on.

It should be noted that FIG. 1 is only an example of the order in which operations S110 and S120 are performed, and the order of operations S110 and S120 is not limited in the present disclosure. In some embodiments, it may be that operation S110 is performed before operation S120 as shown in FIG. 1; in some embodiments, it may also be that operation S120 is performed before operation S110.

In some embodiments, after the correspondence between the first echo signal and the M transmit channels is determined, the channel separation of the first echo signal may also be performed according to the correspondence between the first echo signal and the M transmit channels.

In some embodiments, transmitting the first detection signal through the M transmit channels may be achieved by: transmitting the first detection signal with pulses phase-stepped by $$(e-1)*\frac{2*\pi}{M}$$

through an eth transmit channel in the M transmit channels, where $e \in \{1, 2, 3, \ldots, M\}$, such that a waveform corresponding to the first detection signal is a waveform with the equally spaced Doppler frequency.

In some embodiments, operation S130 further includes the following operations.

In S131, a first processing is performed on the first echo signal to obtain a first target data.

In S132, a second processing is performed on the second echo signal to obtain a second target data.

In S133, a matching processing is performed on the first target data and the second target data, and the correspondence between the first echo signal and the M transmit channels is determined based on a matching result.

In some embodiments, the first processing and/or the second processing includes a constant false alarm rate (CFAR) detection, which helps to reduce false alarms and improve the accuracy of radar measurements.

In some embodiments, the first processing and/or second processing further includes at least one of the following processing: an analog-to-digital conversion (ADC), a 1D-discrete Fourier transform (for example, 1D-Fast Fourier transform, short for 1D-FFT), a 2D-discrete Fourier transform (2D-FFT) and a non-coherent integration (NCI).

In some embodiments, performing the first processing on the first echo signal to obtain the first target data may be achieved by: performing a channel separation on the first echo signal and obtaining the first target data based on a channel separation result.

In some embodiments, performing the second processing on the second echo signal to obtain the second target data may be achieved by: performing the channel separation on the second echo signal, and obtaining the second target data based on the channel separation result.

In some embodiments, after the processing described above, the first target data obtained includes target point data $T_{AMT}(i)$, where $i \in \{1, \ldots, I_{AMT}\}$; the second target data obtained includes target point data $T_{Am1T}(j)$, where $j \in \{1, \ldots, J_{Am1T}\}$. That is, the first target data includes $I_{AMT}$ target point data $T_{AMT}(i)$, and the second target data includes $J_{Am1T}$ target point data $T_{Am1T}(j)$.

Based on this, performing the matching processing on the first target data and the second target data may be achieved by: searching for a respective one of the target point data $T_{AMT}(i)$ corresponding to each of the target point data $T_{Am1T}(j)$ among $I_{AMT}$ of the target point data $T_{AMT}(i)$, respectively.

It should be noted that the above searching method may be implemented in any of the ways in which the target point data $T_{AMT}(i)$ and the target point data $T_{Am1T}(j)$ reflecting the same target may be found. In order to facilitate the understanding of those skilled in the art, the following examples are given, but it does not imply that it may only be implemented in the following manner. For example, it may also be implemented using a closest point matching algorithm, etc.

In some embodiments, in a case that the target point data $T_{AMT}(i)$ includes a range unit data $k_{AMT}(i)$ and a velocity unit data $P_{AMT}(i)$ corresponding to the target, and the target point data $T_{Am1T}(j)$ includes a range unit data $k_{Am1T}(j)$ and a velocity unit data $P_{Am1T}(j)$ corresponding to the target, the respective one of the target point data $T_{AMT}(i)$ corresponding to each of the target point data $T_{Am1T}(j)$ may be searched among $I_{AMT}$ of the target point data $T_{AMT}(i)$ respectively by the following ways.

(1) A first weight value $W_R(i, j, q)$, a second weight value $W_V(i, j, q)$, and a third weight value $W_{RV}(i, j, q)$ are determined according to the following formulas, respectively:

$$W_R(i, j, q) = |k_{AMT}(i) - k_{Am1T}(j)|;$$

$$W_V(i, j, q) = \left|\left(P_{AMT}(i) + q\frac{p_A}{M}\right) - p_{Am1T}(j)\right|;$$

$$W_{RV}(i, j, q) = \partial \cdot W_R(i, j, q) + \beta \cdot W_V(i, j, q);$$

where $\partial$ and $\beta$ are predetermined coefficients corresponding to the first weight value $W_R(i, j, q)$ and the second weight value $W_V(i, j, q)$, respectively, and in some cases, $\partial+\beta=1$, thus enabling a more intuitive reflection of contribution of the first weight value $W_R(i, j, q)$ and the second weight value $W_V(i, j, q)$ to the third weight value $W_{RV}(i, j, q)$. For example, both $\partial$ and $\beta$ are 0.5, meaning that equal reference to the first weight value $W_R(i, j, q)$ and the second weight value $W_V(i, j, q)$ is made in the third weight value, providing a more balanced and comprehensive reflection to characteristics of the target data. Alternatively, values of ∂ and β may be adjusted according to specific situation in other embodiments. When a range gate has a larger influence, the value of ∂ may be larger than β. When a velocity gate has a larger influence, the value of β may be larger than ∂, which is not limited herein.

(2) In a case that each of the weight values corresponds to predetermined decision thresholds $TH_R$, $TH_V$, $W_{min}(i)$, respectively, whether the target point data $T_{AMT}(i)$ matches with the target point data $T_{Am1T}(j)$ is determined according to the following conditions:

$$W_R(i,j,q) < TH_R,\ W_v(i,j,q) < TH_V,\ W_{RV}(i,j,q) < W_{min}(i).$$

In a case that a minimum weight value determination is satisfied, it is determined that the target point data $T_{AMT}(i)$ matches with the corresponding target point data $T_{Am1T}(j)$. Optionally, it is considered that the above minimum weight value determination is satisfied when at least one of the above three determination formulas is satisfied.

Or, in a case that the above minimum weight value determination is not satisfied, it is determined that the target point data $T_{AMT}(i)$ does not match with the corresponding target point data $T_{Am1T}(j)$. For example, if none of the above three determination formulas is satisfied, it is considered that the above minimum weight value determination is not satisfied.

After the above matching, that is, after searching for the corresponding target point data $T_{AMT}(i)$ among $I_{AMT}$ of the target point data $T_{AMT}$ (i), respectively, transmit channels corresponding to the m1 transmit channels in the M transmit channels are determined; and the correspondence between the first echo signal and the M transmit channels is determined according to the corresponding transmit channels.

In some embodiments, the method further includes: after determining the correspondence between the first echo signal and the M transmit channels based on the matching result, correcting the first target data based on the correspondence between the first echo signal and the M transmit channels to obtain a third target data.

It should be noted that the third weight value $W_{RV}(i, j, q)$ is mainly used to comprehensively evaluate whether the target point data $T_{AMT}(i)$ matches with the corresponding target point data $T_{Am1T}(j)$ from the velocity gate and the range gate, and setting the third weight value $W_{RV}(i, j, q)$ helps to improve the accuracy of the match. In some cases, it is also possible to determine without the third weight value $W_{RV}(i, j, q)$, which will not be described here.

In some embodiments, when m1 is equal to 1, i.e., the m1 transmit channels used to transmit the second detection signal include a first transmit channel, determining the transmit channel corresponding to the m1 transmit channel in the M transmit channels according to the correspondence between the target point data $T_{AMT}(i)$ and the target point data $T_{Am1T}(j)$ may be achieved by: determining a second transmit channel corresponding to the first transmit channel among the M transmit channels according to the correspondence between the target point data $T_{AMT}(i)$ and the target point data $T_{Am1T}(j)$.

Accordingly, the first target data is corrected according to the correspondence between the first echo signal and the M transmit channels to obtain the third target data, which may be achieved by: correcting the first target data according to a position of the second transmit channel in the M transmit channels to obtain the third target data.

In some embodiments, the radar includes L physical receive channels, and after performing a first channel separation on the first echo signal, M*L virtual receive channels may be obtained. Accordingly, a second channel separation may also be performed on the third target data to obtain target data corresponding to the M*L virtual receive channels. Thus, according to the target data corresponding to the M*L virtual receive channels, angle measurement, target analysis, and other operations may be performed on the target.

Herein, a digital beam forming (DBF) algorithm or a deterministic maximum likelihood (DML) algorithm may be used for the angle measurement for the target, which is not limited here and may be adjusted according to the specific situation.

In some embodiments, a number of transmit channels M corresponding to the first detection signal is 4, a number of transmit channels m1 corresponding to the second detection signal is 1, and the second detection signal is transmitted through a first channel TX1, and numbers of physical receive channels corresponding to both the first detection signal and the second detection signal are $L_A$. That is, the first detection signal corresponds to 4T DDM-MIMO waveform, and the second detection signal corresponds to 1T TDM-MIMO waveform.

In some embodiments, the physical receive channels corresponding to the first detection signal and the second detection signal are typically 4, i.e., $L_A$=4.

To facilitate a better understanding of the above embodiments by those skilled in the art, further explanation will be provided below.

The first detection signal is generated by the 4T DDM-MIMO waveform, hereinafter referred to as an A_4T waveform. The second detection signal is generated by the 1T TDM-MIMO waveform, hereinafter referred to as a A_1T waveform. 4T means that the first detection signal includes four channels of signals, and 1T means that the second detection signal includes one channel of signals.

Figure 2:
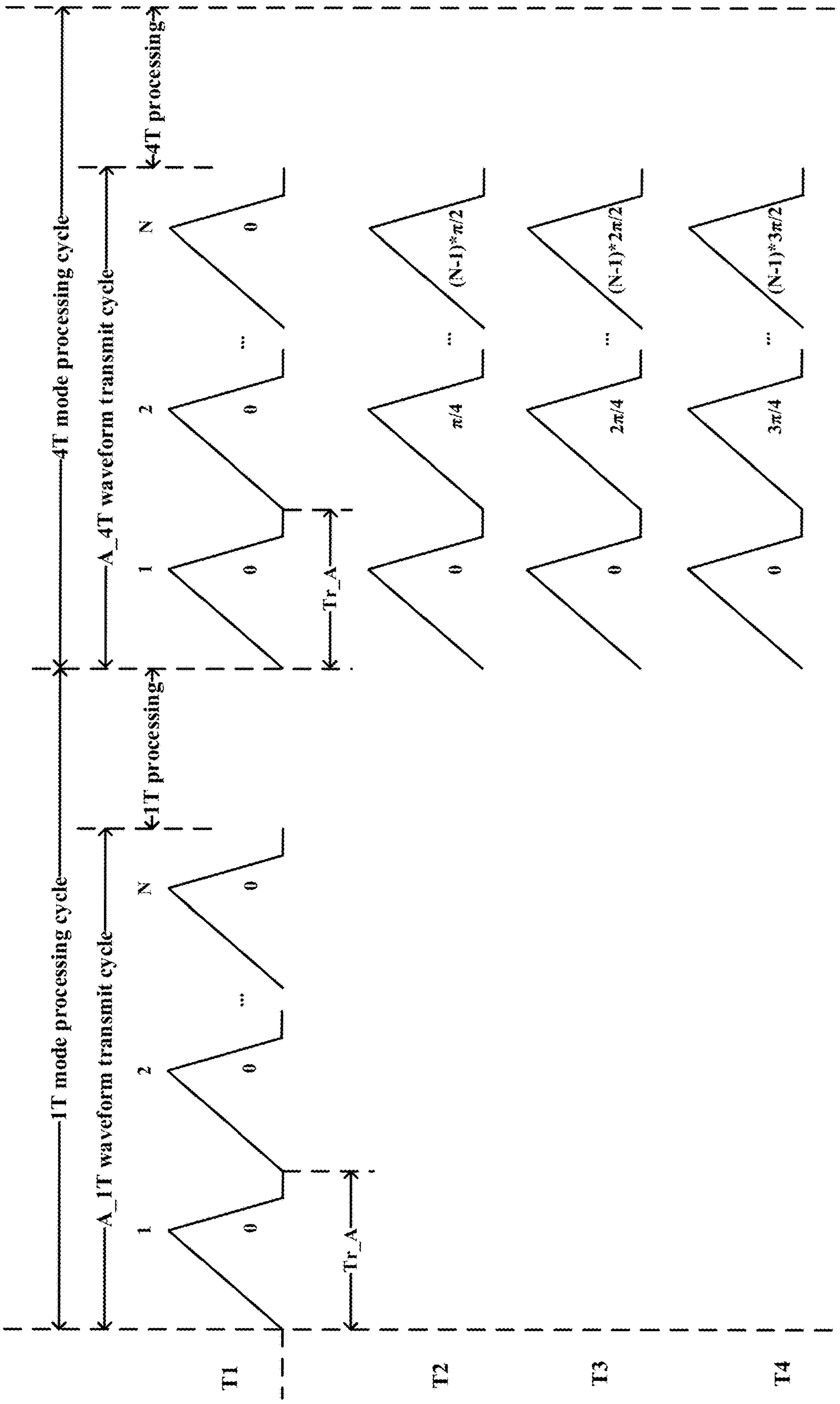
FIG. 2 is a schematic diagram of a waveform with two sub-waveforms according to an embodiment of the present disclosure.
Figure 3:
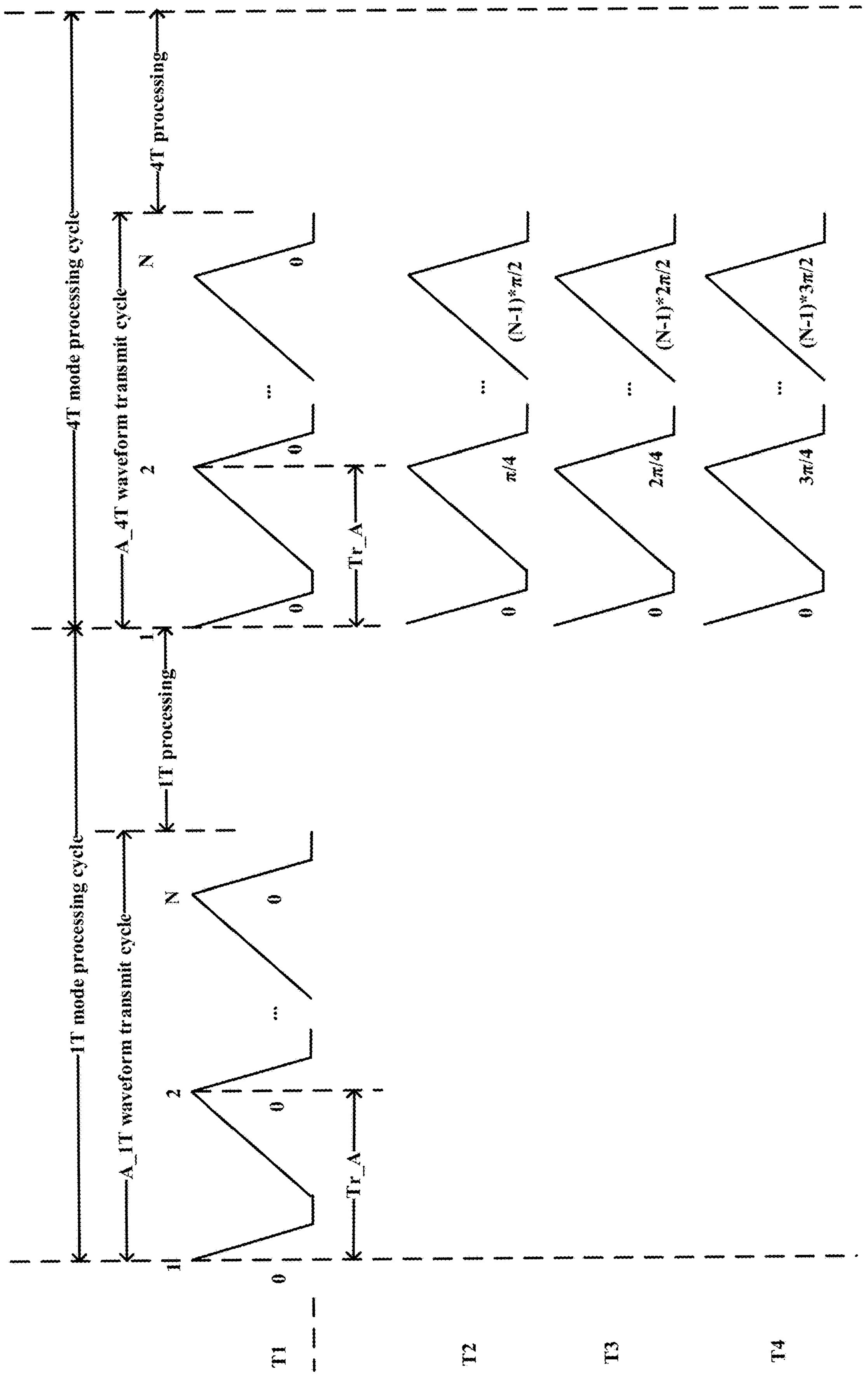
FIG. 3 is a schematic diagram of another waveform with two sub-waveforms according to an embodiment of the present disclosure.

A DDM spacing between signals transmitted from four transmit channels TX1, TX2, TX3, and TX4 is phase-stepped by $$(e-1)*\frac{2*\pi}{4},$$

where e∈{1, 2, 3, 4}, which means an equally spaced DDM waveform with four channels. Reference may be made to FIG. 2 and FIG. 3 for details. The A_4T waveform is a frequency modulation continuous wave (FMCW) signal, T1, T2, T3, and T4 simultaneously transmit $N_A$ pulses, with a pulse period of $Tr_A$. Parameters (bandwidth, FM slope, sampling rate\sample start point\end point, etc.) within the pulses in the A_4T waveform are the same as those of the A_1T waveform, and only initial phases of the pulses are different, which are as follows.

T1 transmission: the pulses are phase-stepped by 0 rad, respectively: 0, 0, 0, . . . , 0;

T2 transmission: the pulses are phase-stepped by $$\frac{\pi}{2},$$

respectively:

$$0, 1\cdot\frac{\pi}{2}, 2\cdot\frac{\pi}{2} \ldots, (N_A-1)\cdot\frac{\pi}{2};$$

T3 transmission: the pulses are phase-stepped by $$\frac{2\pi}{2},$$

respectively:

$$0, 1\cdot\frac{2\pi}{2}, 2\cdot\frac{2\pi}{2} \ldots, (N_A-1)\cdot\frac{2\pi}{2};$$

T4 transmission: the pulses are phase-stepped by $$\frac{3\pi}{2},$$

respectively:

$$0, 1\cdot\frac{3\pi}{2}, 2\cdot\frac{3\pi}{2} \ldots, (N_A-1)\cdot\frac{3\pi}{2}.$$

That is, when there are e transmit channels, each pulse sent in a sth transmit channel is phase-stepped by $$(s-1)*\frac{2*\pi}{e},$$

where s∈{1, 2, . . . , e}, and e is a positive integer.

It should be noted that, as can be seen with reference to FIGS. 2 and 3, the first detection signal and the second detection signal may not only use a rising segment of the pulse, but also use a falling segment of the pulse. The pulse described in the embodiments of the present disclosure may also be referred to as chirp. Further, the first detection signal and the second detection signal may also use the rising segment of the pulse and the falling segment of the pulse, respectively. Pulse waveforms of the first detection signal and the second detection signal may be designed flexibly.

Referring to FIGS. 2 and 3 again, the A_1T waveform is the FMCW signal, T1 transmits $N_A$ pulses with a pulse period of $Tr_A$, and an initial phase of each pulse modulation is phase-stepped by 0rad, respectively: 0, 0, 0, . . . , 0.

Figure 4:
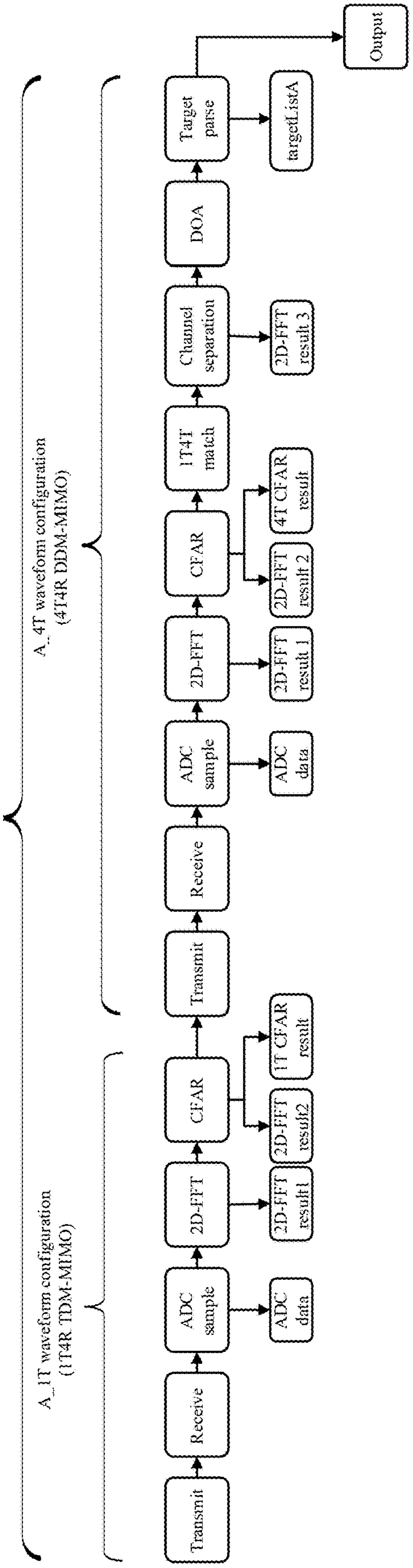
FIG. 4 is a general flow diagram of a signal processing method according to an embodiment of the present disclosure.

Referring to FIG. 4, the two signals are processed as follows.

I. A_1T Waveform Processing Procedure (1) The second detection signal generated by the A_1T waveform is transmitted by one transmit channel, and is received by each of the receive channels after being reflected by the target. After each of the receive channels (4 in total) is subject to ADC sample, ADC data is generated, which may be expressed as follows:

$$S_{A1TADC}(m, n, l), m \in \{1, 2, \ldots, M_A\}, n \in \{1, 2, \ldots, N_A\}, l \in \{1, 2, \ldots, L_A\};$$

where, $M_A$ is a number of sampling points inside the pulse, $N_A$ is a number of pulses, and $L_A$ is a number of the receive channels.

(2) The ADC data, after 2D-FFT (range and velocity 2D-FFT) processing, may be expressed as:

$$S_{A1T2DFFT1}(k, p, l), k \in \{1, 2, \ldots, K_A\}, p \in \{1, 2, \ldots, P_A\}, l \in \{1, 2, \ldots, L_A\};$$

where, $K_A$ is a number of FFT points in the range gate, $P_A$ is a number of FFT points in a velocity gate, and $L_A$ is the number of the receive channels.

(3) NCI is performed on the $S_{A1T2DFFT1}$(k, p, l) data after the 2D-FFT processing to form a detection matrix, which is expressed as follows:

$$S_{A1TNCI}(k, p) = \frac{1}{L_A}\cdot\sum_{l=1}^{L_A}|S_{A1T2DFFT1}(k, p, l)|^2,$$
$$k \in \{1, 2, \ldots, K_A\}, p \in \{1, 2, \ldots, P_A\};$$

where, $K_A$ is the number of FFT points in the range gate and $P_A$ is the number of FFT points in the velocity gate.

(4) CFAR detection is performed based on a $S_{A1TNCI}$(k, p) plane, and assuming that $J_{A1T}$ targets are detected, a detection result is expressed as:

$$T_{A1T}(j), j \in \{1, 2, \ldots, J_{A1T}\};$$

At this point, a range unit and a velocity unit of each target are:

$$k_{A1T}(j) \in \{1, 2, \ldots, K_A\};$$
$$P_{A1T}(j) \in \{1, 2, \ldots, P_A\};$$

$J_{A1T}$ targets $T_{A1T}$(j) are obtained by the CFAR detection, and constitute the second target data. Detected targets are stored in memory for later A_4T wave processing.

II. A_4T Signal Processing Procedure (1) The first detection signal generated by the A_4T waveform is transmitted by four transmit channels, and received by each of the receive channels after being reflected by the target. After each of the receive channels (4 in total) is subject to the ADC sample, ADC data is generated and is expressed as follows:

$$S_{A4TADC}(m, n, l), m \in \{1, 2, \ldots, M_A\}, n \in \{1, 2, \ldots, N_A\} l \in \{1, 2, \ldots, L_A\};$$

where, $M_A$ is the number of sampling points inside the pulse, $N_A$ is the number of pulses, and $L_A$ is the number of the receive channels.

(2) The ADC data, after 2D-FFT (range and velocity 2D-FFT) processing, may be expressed as:

$$S_{A4T2DFFT1}(k,p,l),\ k\in\{1,2,\ldots,K_A\},\quad p\in\{1,2,\ldots,P_A\},\ l\in\{1,2,\ldots,L_A\};$$

where, $K_A$ is the number of FFT points in the range gate, $P_A$ is the number of FFT points in the velocity gate, and $L_A$ is the number of the receive channels;

(3) The $S_{A4T2DFFT}$(k, p, l) signal is subject to preliminary channel separation, and separated signal is expressed as:

$$S_{A4T2DFFT2}(k,p,l),\ k\in\{1,2,\ldots,K_A\},\quad p\in\left\{1,2,\ldots,\frac{P_A}{4}\right\},\ l\in\{1,2,\ldots,4L_A\};$$

Figure 5:
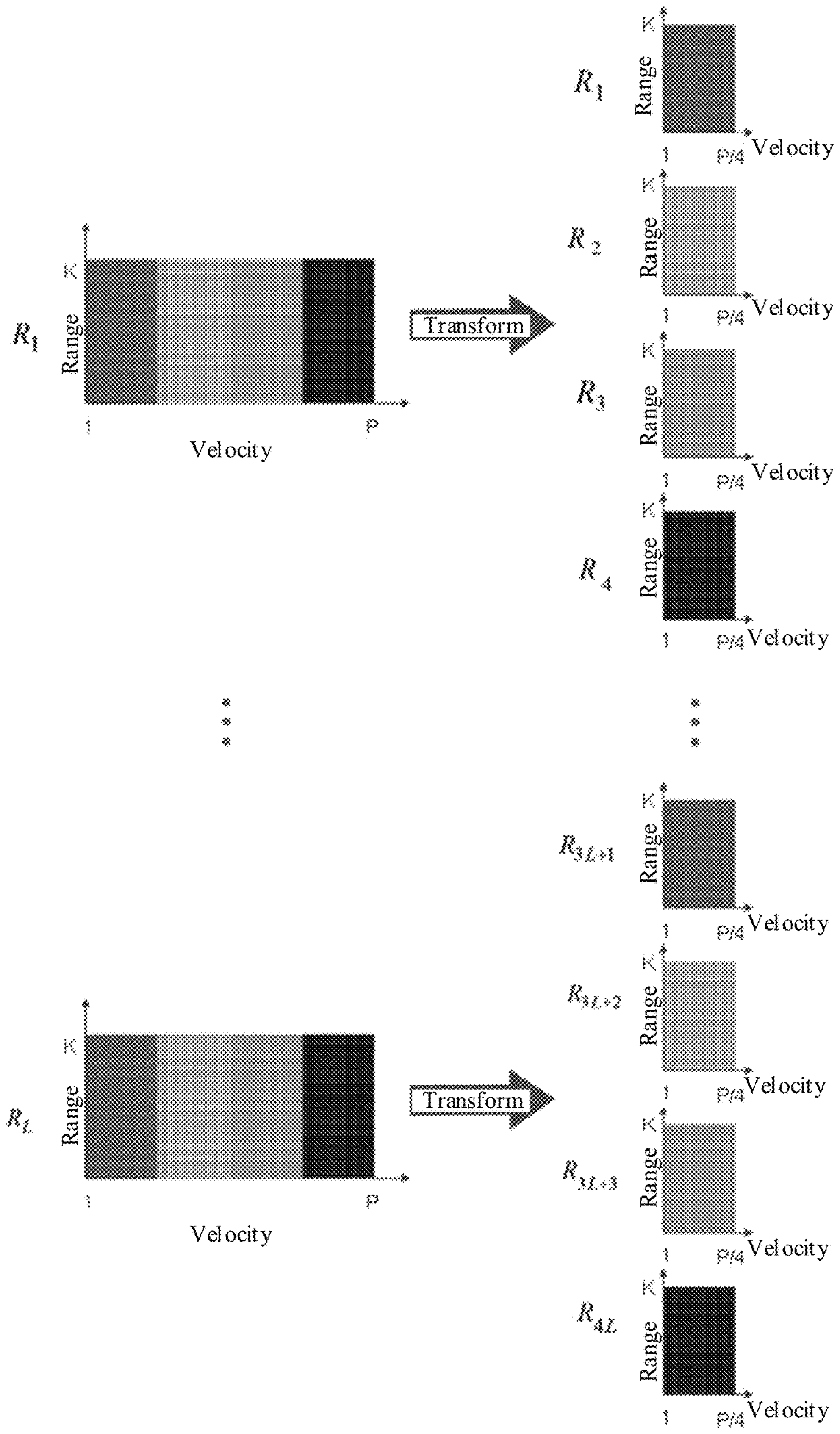
FIG. 5 is a schematic diagram of an initial channel separation according to an embodiment of the present disclosure.

To further illustrate the method of the preliminary channel separation, as shown in FIG. 5, 2D-FFT data of $R_1$ receive channel is sliced into 4 receive channels, that is, the whole velocity gate (called 1 whole region of DDM-MIMO) is evenly divided into 4 parts (called 4 sub-regions of DDM-MIMO) to form data of the 4 receive channels, and each of the other receive channels is operated according to this method to form a total of 16 receive channel data.

In some cases, the number of R1 receive channels refers to the physical receive channels, and the 4 receive channels formed after the slice refers to the virtual receive channels.

(4) NCI is performed on the $S_{A4T2DFFT2}$(k, p, l) data after channel separation to form the detection matrix, expressed as follows:

$$S_{A4TNCI}(k,p)=\frac{1}{4L_A}\cdot\sum_{l=1}^{4L_A}|S_{A4T2DFFT2}(k,p,l)|^2,\quad k\in\{1,2,\ldots,K_A\},\ p\in\{1,2,\ldots,P_A\};$$

where, $K_A$ is the number of FFT points in the range gate and $P_A$ is the number of FFT points in the velocity gate.

(5) CFAR detection is performed based on the $S_{A4TNCI}$(k, p) plane, and assuming that $I_{A4T}$ targets are detected, the detection result is expressed as:

$$T_{A4T}(i),\ i\in\{1,2,\ldots,I_{A4T}\};$$

At this point, the range unit and the velocity unit of each target are:

$$k_{A4T}(i)\in\{1,2,\ldots,K_A\};\quad p_{A4T}(i)\in\left\{1,2,\ldots,\frac{P_A}{4}\right\};$$

$I_{A4T}$ targets $T_{A4T}$(i) are obtained by CFAR detection, which constitute the second target data and stored in memory for later processing.

Figure 6:
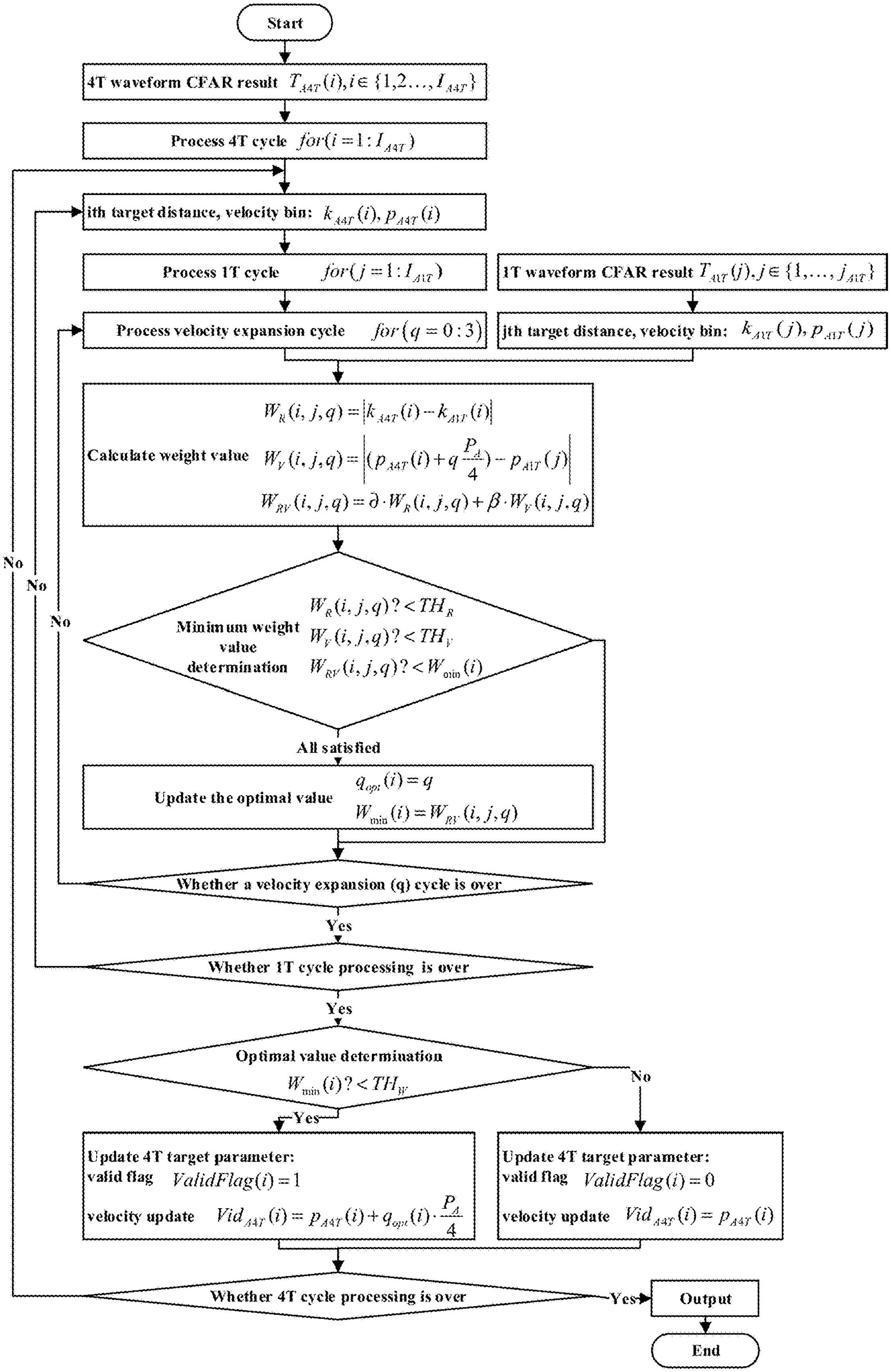
FIG. 6 is a flowchart of matching a first target data with a second target data according to an embodiment of the present disclosure.

III. After the CFAR processing for the first detection signal and the second detection signal, a matching processing is performed on the first target data the second target data. Referring to the flowchart shown in FIG. 6, the matching procedure is specified as follows.

(1) The target $T_{A1T}$(j) in the second target data is matched with the target $T_{A4T}$(i) in the first target data one by one;

(2) When the target $T_{A4T}$(i) is matched with the target $T_{A1T}$(j) one by one, the following weight value calculation is performed:

$$W_R(i,j,q)=|k_{A4T}(i)-k_{A1T}(j)|;$$

$$W_V(i,j,q)=\left|\left(P_{A4T}(i)+q\frac{P_A}{4}\right)-p_{A1T}(j)\right|;$$

$$W_{RV}(i,j,q)=\partial\cdot W_R(i,j,q)+\beta\cdot W_V(i,j,q);$$

Minimum weight value determination: $W_R$(i, j, q)?<$TH_R$, $W_V$(i, j, q)?<$TH_V$, $W_{RV}$(i, j, q)?<$W_{min}$(i); where "?" means "whether or not".

If the above minimum weight value determinations are satisfied at the same time, it means that the target $T_{A4T}$(i) matches with the target $T_{A1T}$(j), and then proceeds to the next operation. Optionally, when at least one of the above minimum weight value determination formulas is satisfied, it means that the target $T_{A4T}$(i) matches with the target $T_{A1T}$(j).

If the above minimum weight determinations are not satisfied at the same time, it means that there is no match, then the target $T_{A4T}$(i) is matched with the next target $T_{A1T}$(j) using similar procedure as described above, and if there is still no match, then the target $T_{A4T}$(i) is subject to a velocity expansion cycle for (q=0:3) in the velocity gate, and then matched with each target $T_{A1T}$(j) in the second target data one by one, until it is matched.

(3) When the target $T_{A4T}$(i) is matched with the target $T_{A1T}$(j), an optimal value is updated:

$$q_{opt}(i)=q;$$

$$W_{min}(i)=W_{RV}(i,j,q).$$

(4) Perform optimal value determinations;

If $W_{min}$(i) is less than a preset threshold value $TH_W$, the first target data is updated as follows:

$$\text{Valid flag } ValidFlag(i)=1;$$

$$\text{Velocity update } Vid_{A4T}(i)=P_{A4T}(i)+q_{opt}(i)*\frac{P_A}{4};$$

If $W_{min}$(i) is not less than the preset threshold value $TH_W$, the second target data is updated as follows:

$$\text{Valid flag } ValidFlag(i)=0;$$

$$\text{Velocity update } Vid_{A4T}(i)=P_{A4T}(i).$$

(5) For each target $T_{A4T}$(i), i∈{1, . . . , $I_{A1T}$} in the first target data, the above matching operations are repeated until a cycle of the $I_{A1T}$ target $T_{A4T}$(i) is completed.

IV. Based on the above matching result, the data $S_{A4T2DFFT2}$(k, p, l) (i.e., the first target data) corresponding to a target position of each channel is corrected (rearranged) to generate $S_{A4T2DFFT3}$(k, p, l) data (the third target data) so that the data $S_{A4T2DFFT2}(k, p, l)$ is in the correct channel, i.e., the first target data is corrected to obtain the third target data.

The specific processing flow is as follows:

Based on CFAR results of the A_4T wave, an ith target point is expressed as follows:

$$T_{A4T}(i),\ i \in \{1, 2, \ldots, I_{A4T}\};$$

At this point, the range unit and velocity unit of the target are respectively:

$$k_{A4T}(i) \in \{1, 2, \ldots, K_A\};$$
$$p_{A4T}(i) \in \left\{1, 2, \ldots, \frac{P_A}{4}\right\};$$

If:

$$1 \le Vid_{4T} \le \frac{P_A}{4},$$

it means that a target velocity causes n whole regions to be offset, or does not cause an offset of one DDM-MIMO sub-region in the velocity gate. In this case, the subsequent direction of arrival (DOA) processing is not affected, so the target position does not need to be changed, that is, the processing is as follows:

$$S_{A4T2DFFT3}(k_{A4T}(i), p_{A4T}(i), 1) = S_{A4T2DFFT2}(k_{A4T}(i), p_{A4T}(i), 1);$$
$$S_{A4T2DFFT3}(k_{A4T}(i), p_{A4T}(i), 2) = S_{A4T2DFFT2}(k_{A4T}(i), p_{A4T}(i), 2);$$
$$S_{A4T2DFFT3}(k_{A4T}(i), p_{A4T}(i), 3) = S_{A4T2DFFT2}(k_{A4T}(i), p_{A4T}(i), 3);$$
$$S_{A4T2DFFT3}(k_{A4T}(i), p_{A4T}(i), 4) = S_{A4T2DFFT2}(k_{A4T}(i), p_{A4T}(i), 4);$$
$$S_{A4T2DFFT3}(k_{A4T}(i), p_{A4T}(i), 5) = S_{A4T2DFFT2}(k_{A4T}(i), p_{A4T}(i), 5);$$
$$S_{A4T2DFFT3}(k_{A4T}(i), p_{A4T}(i), 6) = S_{A4T2DFFT2}(k_{A4T}(i), p_{A4T}(i), 6);$$
$$S_{A4T2DFFT3}(k_{A4T}(i), p_{A4T}(i), 7) = S_{A4T2DFFT2}(k_{A4T}(i), p_{A4T}(i), 7);$$
$$S_{A4T2DFFT3}(k_{A4T}(i), p_{A4T}(i), 8) = S_{A4T2DFFT2}(k_{A4T}(i), p_{A4T}(i), 8);$$
$$S_{A4T2DFFT3}(k_{A4T}(i), p_{A4T}(i), 9) = S_{A4T2DFFT2}(k_{A4T}(i), p_{A4T}(i), 9);$$
$$S_{A4T2DFFT3}(k_{A4T}(i), p_{A4T}(i), 10) = S_{A4T2DFFT2}(k_{A4T}(i), p_{A4T}(i), 10);$$
$$S_{A4T2DFFT3}(k_{A4T}(i), p_{A4T}(i), 11) = S_{A4T2DFFT2}(k_{A4T}(i), p_{A4T}(i), 11);$$
$$S_{A4T2DFFT3}(k_{A4T}(i), p_{A4T}(i), 12) = S_{A4T2DFFT2}(k_{A4T}(i), p_{A4T}(i), 12);$$
$$S_{A4T2DFFT3}(k_{A4T}(i), p_{A4T}(i), 13) = S_{A4T2DFFT2}(k_{A4T}(i), p_{A4T}(i), 13);$$
$$S_{A4T2DFFT3}(k_{A4T}(i), p_{A4T}(i), 14) = S_{A4T2DFFT2}(k_{A4T}(i), p_{A4T}(i), 14);$$
$$S_{A4T2DFFT3}(k_{A4T}(i), p_{A4T}(i), 15) = S_{A4T2DFFT2}(k_{A4T}(i), p_{A4T}(i), 15);$$
$$S_{A4T2DFFT3}(k_{A4T}(i), p_{A4T}(i), 16) = S_{A4T2DFFT2}(k_{A4T}(i), p_{A4T}(i), 16).$$

If:

$$\frac{P_A}{4} + 1 \le Vid_{4T} \le 2 \cdot \frac{P_A}{4},$$

it means that the target velocity causes an offset of one DDM-MIMO sub-region, or an offset of n whole regions plus one sub-region. In this case, the DOA angle measurement may have errors, so the target position needs to be adjusted between each of the receive channels, and the processing is as follows:

$$S_{A4T2DFFT3}(k_{A4T}(i), p_{A4T}(i), 1) = S_{A4T2DFFT2}(k_{A4T}(i), p_{A4T}(i), 2);$$
$$S_{A4T2DFFT3}(k_{A4T}(i), p_{A4T}(i), 2) = S_{A4T2DFFT2}(k_{A4T}(i), p_{A4T}(i), 3);$$
$$S_{A4T2DFFT3}(k_{A4T}(i), p_{A4T}(i), 3) = S_{A4T2DFFT2}(k_{A4T}(i), p_{A4T}(i), 4);$$
$$S_{A4T2DFFT3}(k_{A4T}(i), p_{A4T}(i), 4) = S_{A4T2DFFT2}(k_{A4T}(i), p_{A4T}(i), 1);$$
$$S_{A4T2DFFT3}(k_{A4T}(i), p_{A4T}(i), 5) = S_{A4T2DFFT2}(k_{A4T}(i), p_{A4T}(i), 6);$$
$$S_{A4T2DFFT3}(k_{A4T}(i), p_{A4T}(i), 6) = S_{A4T2DFFT2}(k_{A4T}(i), p_{A4T}(i), 7);$$
$$S_{A4T2DFFT3}(k_{A4T}(i), p_{A4T}(i), 7) = S_{A4T2DFFT2}(k_{A4T}(i), p_{A4T}(i), 8);$$
$$S_{A4T2DFFT3}(k_{A4T}(i), p_{A4T}(i), 8) = S_{A4T2DFFT2}(k_{A4T}(i), p_{A4T}(i), 5);$$
$$S_{A4T2DFFT3}(k_{A4T}(i), p_{A4T}(i), 9) = S_{A4T2DFFT2}(k_{A4T}(i), p_{A4T}(i), 10);$$
$$S_{A4T2DFFT3}(k_{A4T}(i), p_{A4T}(i), 10) = S_{A4T2DFFT2}(k_{A4T}(i), p_{A4T}(i), 11);$$
$$S_{A4T2DFFT3}(k_{A4T}(i), p_{A4T}(i), 11) = S_{A4T2DFFT2}(k_{A4T}(i), p_{A4T}(i), 12);$$
$$S_{A4T2DFFT3}(k_{A4T}(i), p_{A4T}(i), 12) = S_{A4T2DFFT2}(k_{A4T}(i), p_{A4T}(i), 9);$$
$$S_{A4T2DFFT3}(k_{A4T}(i), p_{A4T}(i), 13) = S_{A4T2DFFT2}(k_{A4T}(i), p_{A4T}(i), 14);$$
$$S_{A4T2DFFT3}(k_{A4T}(i), p_{A4T}(i), 14) = S_{A4T2DFFT2}(k_{A4T}(i), p_{A4T}(i), 15);$$
$$S_{A4T2DFFT3}(k_{A4T}(i), p_{A4T}(i), 15) = S_{A4T2DFFT2}(k_{A4T}(i), p_{A4T}(i), 16);$$
$$S_{A4T2DFFT3}(k_{A4T}(i), p_{A4T}(i), 16) = S_{A4T2DFFT2}(k_{A4T}(i), p_{A4T}(i), 13).$$

If:

$$2 \cdot \frac{P_A}{4} + 1 \le Vid_{4T} \le 3 \cdot \frac{P_A}{4},$$

it means that the target velocity causes an offset of two DDM-MIMO sub-regions, or an offset of n whole regions plus two sub-regions. In this case, DOA angle measurement may have errors, so the target position needs to be adjusted between each of the receive channels, and the processing is as follows:

$$S_{A4T2DFFT3}(k_{A4T}(i), p_{A4T}(i), 1) = S_{A4T2DFFT2}(k_{A4T}(i), p_{A4T}(i), 3);$$
$$S_{A4T2DFFT3}(k_{A4T}(i), p_{A4T}(i), 2) = S_{A4T2DFFT2}(k_{A4T}(i), p_{A4T}(i), 4);$$
$$S_{A4T2DFFT3}(k_{A4T}(i), p_{A4T}(i), 3); = S_{A4T2DFFT2}(k_{A4T}(i), p_{A4T}(i), 1);$$
$$S_{A4T2DFFT3}(k_{A4T}(i), p_{A4T}(i), 4) = S_{A4T2DFFT2}(k_{A4T}(i), p_{A4T}(i), 2);$$
$$S_{A4T2DFFT3}(k_{A4T}(i), p_{A4T}(i), 5) = S_{A4T2DFFT2}(k_{A4T}(i), p_{A4T}(i), 7);$$
$$S_{A4T2DFFT3}(k_{A4T}(i), p_{A4T}(i), 6) = S_{A4T2DFFT2}(k_{A4T}(i), p_{A4T}(i), 8);$$
$$S_{A4T2DFFT3}(k_{A4T}(i), p_{A4T}(i), 7) = S_{A4T2DFFT2}(k_{A4T}(i), p_{A4T}(i), 5);$$
$$S_{A4T2DFFT3}(k_{A4T}(i), p_{A4T}(i), 8) = S_{A4T2DFFT2}(k_{A4T}(i), p_{A4T}(i), 6);$$
$$S_{A4T2DFFT3}(k_{A4T}(i), p_{A4T}(i), 9) = S_{A4T2DFFT2}(k_{A4T}(i), p_{A4T}(i), 11);$$
$$S_{A4T2DFFT3}(k_{A4T}(i), p_{A4T}(i), 10) = S_{A4T2DFFT2}(k_{A4T}(i), p_{A4T}(i), 12);$$
$$S_{A4T2DFFT3}(k_{A4T}(i), p_{A4T}(i), 11) = S_{A4T2DFFT2}(k_{A4T}(i), p_{A4T}(i), 9);$$
$$S_{A4T2DFFT3}(k_{A4T}(i), p_{A4T}(i), 12) = S_{A4T2DFFT2}(k_{A4T}(i), p_{A4T}(i), 10);$$
$$S_{A4T2DFFT3}(k_{A4T}(i), p_{A4T}(i), 13) = S_{A4T2DFFT2}(k_{A4T}(i), p_{A4T}(i), 15);$$
$$S_{A4T2DFFT3}(k_{A4T}(i), p_{A4T}(i), 14) = S_{A4T2DFFT2}(k_{A4T}(i), p_{A4T}(i), 16);$$
$$S_{A4T2DFFT3}(k_{A4T}(i), p_{A4T}(i), 15) = S_{A4T2DFFT2}(k_{A4T}(i), p_{A4T}(i), 13);$$
$$S_{A4T2DFFT3}(k_{A4T}(i), p_{A4T}(i), 16) = S_{A4T2DFFT2}(k_{A4T}(i), p_{A4T}(i), 14).$$

If:

$$3 \cdot \frac{L_A}{4} + 1 \le Vid_{4T} \le 4 \cdot \frac{L_A}{4},$$

it means that the target velocity causes an offset of three DDM-MIMO sub-regions, or an offset of n whole regions plus three sub-regions. In this case, the DOA angle measurement may have errors, so the target position needs to be adjusted between each of the receive channels, and the processing is as follows:

$$S_{A4T2DFFT3}(k_{A4T}(i), p_{A4T}(i), 1) = S_{A4T2DFFT2}(k_{A4T}(i), p_{A4T}(i), 4);$$
$$S_{A4T2DFFT3}(k_{A4T}(i), p_{A4T}(i), 2) = S_{A4T2DFFT2}(k_{A4T}(i), p_{A4T}(i), 1);$$
$$S_{A4T2DFFT3}(k_{A4T}(i), p_{A4T}(i), 3) = S_{A4T2DFFT2}(k_{A4T}(i), p_{A4T}(i), 2);$$
$$S_{A4T2DFFT3}(k_{A4T}(i), p_{A4T}(i), 4) = S_{A4T2DFFT2}(k_{A4T}(i), p_{A4T}(i), 3);$$
$$S_{A4T2DFFT3}(k_{A4T}(i), p_{A4T}(i), 5) = S_{A4T2DFFT2}(k_{A4T}(i), p_{A4T}(i), 8);$$
$$S_{A4T2DFFT3}(k_{A4T}(i), p_{A4T}(i), 6) = S_{A4T2DFFT2}(k_{A4T}(i), p_{A4T}(i), 5);$$
$$S_{A4T2DFFT3}(k_{A4T}(i), p_{A4T}(i), 7) = S_{A4T2DFFT2}(k_{A4T}(i), p_{A4T}(i), 6);$$
$$S_{A4T2DFFT3}(k_{A4T}(i), p_{A4T}(i), 8) = S_{A4T2DFFT2}(k_{A4T}(i), p_{A4T}(i), 7);$$
$$S_{A4T2DFFT3}(k_{A4T}(i), p_{A4T}(i), 9) = S_{A4T2DFFT2}(k_{A4T}(i), p_{A4T}(i), 12);$$
$$S_{A4T2DFFT3}(k_{A4T}(i), p_{A4T}(i), 10) = S_{A4T2DFFT2}(k_{A4T}(i), p_{A4T}(i), 9);$$
$$S_{A4T2DFFT3}(k_{A4T}(i), p_{A4T}(i), 11) = S_{A4T2DFFT2}(k_{A4T}(i), p_{A4T}(i), 10);$$
$$S_{A4T2DFFT3}(k_{A4T}(i), p_{A4T}(i), 12) = S_{A4T2DFFT2}(k_{A4T}(i), p_{A4T}(i), 11);$$
$$S_{A4T2DFFT3}(k_{A4T}(i), p_{A4T}(i), 13) = S_{A4T2DFFT2}(k_{A4T}(i), p_{A4T}(i), 16);$$
$$S_{A4T2DFFT3}(k_{A4T}(i), p_{A4T}(i), 14) = S_{A4T2DFFT2}(k_{A4T}(i), p_{A4T}(i), 13);$$
$$S_{A4T2DFFT3}(k_{A4T}(i), p_{A4T}(i), 15) = S_{A4T2DFFT2}(k_{A4T}(i), p_{A4T}(i), 14);$$
$$S_{A4T2DFFT3}(k_{A4T}(i), p_{A4T}(i), 16) = S_{A4T2DFFT2}(k_{A4T}(i), p_{A4T}(i), 15).$$

V. DOA Angle Measurement Processing

After the correction of the first target data, i.e., after the correction of the preliminary channel separation, the following 2D-FFT data block is formed:

$$S_{A4T2DFFT3}(k, p, l),\ k \in \{1, 2, \ldots, K_A\},$$
$$p \in \left\{1, 2, \ldots, \frac{P_A}{4}\right\},\ l \in \{1, 2, \ldots, L_A\}$$

where $L_A$ is 16 (4T4R), which is the number of virtual channels, and an angle measurement is performed on a direction of arrival (DOA) based on $S_{A4T2DFFT3}(k, p, l)$ data, where DBF angle measurement or DML angle measurement algorithm, etc. may be used, which is not limited herein.

VI. Target Parsing

The range, velocity, and angle (azimuth, pitch) of the target are obtained by multiplying the range bin generated by the processing of the CFAR and DOA angle measurement module, velocity bin and angle bin generated after 1T4T matching by corresponding scaling factors. In addition, a signal to noise ratio (SNR) is estimated and a radar cross section (RCS) is calculated, and the valid flag of target is stored in a structure variable targetListA of a targetList structure.

In some embodiments, in order to achieve the velocity ambiguity resolution to expand a velocity measurement range, it is also possible to use the first detection signal as the A wave and the second detection signal as the B wave, to perform the velocity ambiguity resolution based on the first echo signal and the second echo signal generated by the first detection signal and the second detection signal. That is, the target parsed data targetListA and targetListB obtained based on both the first echo signal and the second echo signal alternately perform velocity resolution. Herein, the specific manner of velocity ambiguity resolution may adopt any method in the existing technologies, which is not limited here. It should be understood that waveform parameters of the first detection signal and the second detection signal in the A-wave or B-wave are not the same, and a period of the second detection signal may be set as a A-wave period, and a period of the first detection signal may be set as a B-wave period. That is, the second detection signal may be used as both the 1T-wave and the A-wave, and the first detection signal may be used as both the 4T-wave and the B-wave, so that the two waveforms may be used for both 1T4T matching and AB waves velocity ambiguity resolution.

It should be noted that not only the first detection signal may be used as the A wave and the second detection signal as the B wave, but also the second detection signal may be used as the A wave and the first detection signal as the B wave, which will not be described here.

It should also be noted that in some cases, the $L_A$ described above indicates a number of physical channels.

It should also be noted that in some cases, the target position adjustment among the receive channels refers to the target position adjustment among the virtual receive channels.

In some cases, alternatively performing the velocity resolution with the data targetListA and targetListB may be implemented as follows.

Assuming that a previous frame (history frame) is the A-wave and a result of the velocity ambiguity resolution processing is targetListA, a current frame is the B-wave and the target parsed frame is targetListB, the result of the history frame (targetListA) is used to perform the velocity ambiguity resolution on the current frame (targetListB).

Firstly, assuming that a processing time of the A-wave is: $T_A = T_{A1T} + T_{A4T}$, and a processing time of the B-wave is: $T_B = T_{B1T} + T_{B4T}$, a range prediction of the successful AB matching points of the history frame is performed and a related range in targetListA is updated, i.e.:

$$R_A = R'_A + V_A * T_A;$$

where, $R_A$ is a range after prediction, $$R'_A$$

is a range before prediction, and $V_A$ is a target velocity after the velocity ambiguity resolution.

A. Then a first matching processing based on the history frame is performed as follows. According to whether the matching between the A wave and the B wave is successful, points in the targetListA may be divided into {targetListA_S (successful), targetListA_U (failed)}; similarly, points in the targetListB may be divided into {targetListB_S (successful), targetListB _U (failed)}. A matching point for each target point in the targetListA_S is searched in the targetListB_U. If the two match, then a success mark of the matching and velocity in the targetListA_S, targetListB_U are updated, otherwise a failure mark is updated. Whether the two match is determined according to the following conditions:

$$|R_A - R_B| < TH1_R;$$

$$|\mathrm{mod}(V2_A, V_{maxB}) - V1_B| < TH1_V;$$

$$|A_A - A_B| < TH_{1A};$$

where, $TH1_R$, $TH1_V$, $TH1_A$ are empirical values of a range threshold, a velocity threshold and an angle threshold, respectively; $V_{maxB}$ is a maximum unambiguous velocity measurement value when performing FFT in velocity gate on the B wave.

B. a second matching processing based on the history frame is performed as follows. After the previous operation, according to whether the matching between the A wave and the B wave is successful, the points in targetListA may be divided into {targetListA_S (successful), targetListA_U (failed)}; similarly, the points in targetListB may be divided into {targetListB_S (successful), {targetListB_U (failed)}. A matching point for each target point in targetListA_U is searched in targetListB_U. If the two match, then the success mark of the matching and velocity in targetListA_U and targetListB_U are updated, otherwise the failure mark is updated. Whether the two match is determined according to the following conditions:

$$|R_A - R_B| < TH2_R;$$

$$|\mathrm{mod}(V1_A + q * V_{maxA}, V_{maxB}) - V1_B| < TH2_V;$$

$$|A_A - A_B| < TH2_A;$$

where, $TH2_R$, $TH2_V$, $TH2_A$ are the empirical values of the range threshold, the velocity threshold, and the angle threshold, respectively. Compared to the threshold values in B), values of this group are larger; $V_{maxA}$, $V_{maxB}$ are the maximum unambiguous velocity measurement values when performing FFT in velocity gate on the A wave and the B wave, respectively. q is a multiple of ambiguity resolution, and may be any value in {−1, 0, 1}.

C. a first matching processing based on the current frame is performed as follows. After the previous operation, according to whether the matching between the A wave and the B wave is successful, the points in targetListA may be divided into {targetListA_S (successful), targetListA_U (failed)}; similarly, the points in targetListB may be divided into {targetListB_S (successful) targetListB_U (failed)}. A matching point for each target point in targetListB_U is searched in targetListA_S. If the two match, the success mark of the matching and velocity in targetListB_U are updated, otherwise the failure mark is updated. Whether the two match is determined according to the following conditions:

$$|R_A - R_B| < TH3_R;$$

$$|\mathrm{mod}(V1_A + q * V_{maxA}, V_{maxB}) - V1_B| < TH3_V;$$

$$|A_A - A_B| < TH3_A;$$

where, $TH3_R$, $TH3_V$, $TH3_A$ are the empirical values of the range threshold, the velocity threshold, and the angle threshold, respectively; $V_{maxA}$, $V_{maxB}$ are maximum unambiguous velocity measurement value when performing FFT in velocity gate on the A-wave and the B-wave, respectively. q is a multiple of ambiguity resolution, and may be any value in {−1, 0, 1}.

D. a second matching processing based on the current frame is performed as follows. After the previous operation, according to whether the matching between the A wave and the B wave is successful, the points in the targetListB may be divided into {targetListB_S (successful), targetListB_U (failed)}. A matching point for each target point in targetListB_U is searched in targetListB_S. If the two match, the success mark of the matching and velocity in targetListB_U are updated, otherwise the failure mark is updated. Whether the two match is determined according to the following conditions:

$$|R_{BU} - R_{BS}| < TH4_R;$$

$$|V1_{BU} + q * V_{maxB}) - V2_{BS}| < TH4_V;$$

$$|A_{AU} - A_{BS}| < TH4_A;$$

where, $TH4_R$, $TH4_V$, $TH4_A$ are the empirical values of the range threshold, the velocity threshold, and the angle threshold, respectively; $V_{maxB}$ is the maximum unambiguous velocity measurement value when performing FFT in velocity gate on the B wave. q is a multiple of ambiguity resolution, and may be any value in {−1, 0, 1}.

An embodiment of the present disclosure provides a signal processing device which is configured to perform the signal processing method described in any of the above embodiments.

An embodiment of the present disclosure provides a radar, including a transceiver and a processor. The transceiver includes at least one antenna. The transceiver is configured to transmit the first detection signal and/or the second detection signal as described in any of the above embodiments, and to receive the first echo signal and/or the second echo signal as described above. The processor is configured to perform the method as described in any of the above embodiments.

An embodiment of the present disclosure provides a readable storage medium including a computer program or instructions. The computer program or instructions, when read and executed by a processor, cause the processor to implement the method as described in any of the above embodiments.

An embodiment of the present disclosure provides a computer program product including computer readable instructions. The computer readable instructions, when read and executed by a radar, cause the radar to implement the method as described in any of the above embodiments.

An embodiment of the present disclosure provides a terminal including the radar as described above.

In some embodiments, the terminal includes a vehicle, a smart home device, or a smart robot, etc..

It should be noted that the foregoing is only preferred embodiments of the present disclosure and the technical principles utilized. It should be understood by those skilled in the art that the present disclosure is not limited to the particular embodiments herein, and it is possible for those skilled in the art to make a variety of obvious changes, readjustments, and substitutions without departing from the scope of protection of the present disclosure. Therefore, although the present disclosure has been described in some detail by the above embodiments, the present disclosure is not limited to the above embodiments, and may include many other equivalent embodiments without departing from the concept of the present disclosure. The scope of the present disclosure is determined by the scope of the appended claims.

What is claimed is:

1. A signal processing method, applied to a radar, wherein the radar comprises M transmit channels, and the method comprises:

transmitting, during a first transmit cycle, a first detection signal through the M transmit channels;

transmitting, during a second transmit cycle that is different from the first transmit cycle, a second detection signal through m1 transmit channels in the M transmit channels, wherein m1<M, and m1 and M are positive integers; and processing a first echo signal and a second echo signal to determine a correspondence between the first echo signal and the M transmit channels;

wherein the first echo signal and the second echo signal are signals generated after the first detection signal and the second detection signal are reflected by a target, respectively;

wherein transmitting the first detection signal through the M transmit channels comprises:

transmitting the first detection signal with pulses phase-stepped by $$(e-1)*\frac{2*\pi}{M}$$

through an $e^{th}$ transmit channel in the M transmit channels, wherein $e\in\{1, 2, 3, \ldots, M\}$.

2. The signal processing method according to claim 1, wherein processing the first echo signal and the second echo signal to determine the correspondence between the first echo signal and the M transmit channels comprises:

performing a first processing on the first echo signal to obtain a first target data;

performing a second processing on the second echo signal to obtain a second target data;

performing a matching processing on the first target data and the second target data, and determining the correspondence between the first echo signal and the M transmit channels based on a matching result.

3. The signal processing method according to claim 2, wherein the first target data comprises target point data $T_{AMT}(i)$ and the second target data comprises target point data $T_{Am1T}(j)$, wherein $i\in\{1, \ldots, I_{AMT}\}$, $j\in\{1, \ldots, J_{Am1T}\}$, and both $I_{AMT}$ and $J_{Am1T}$ are positive integers;

performing the matching processing on the first target data and the second target data comprises:

searching for a respective one of the target point data $T_{AMT}(i)$ corresponding to each of the target point data $T_{Am1T}(j)$ among $I_{AMT}$ of the target point data $T_{AMT}(i)$, respectively.

4. The signal processing method according to claim 3, wherein the target point data $T_{AMT}(i)$ comprises a range unit data $k_{AMT}(i)$ and a velocity unit data $P_{AMT}(i)$ corresponding to the target, and the target point data $T_{Am1T}(j)$ comprises a range unit data $k_{Am1T}(j)$ and a velocity unit data $p_{Am1T}(j)$ corresponding to the target;

searching for the respective one of the target point data $T_{AMT}(i)$ corresponding to each of the target point data $T_{Am1T}(j)$ among $I_{AMT}$ of the target point data $T_{AMT}(i)$ respectively, comprises:

determining a first weight value $W_R(i, j, q)$, a second weight value $W_V(i, j, q)$, and a third weight value $W_{RV}(i, j, q)$ according to the following formulas, respectively:

$$W_R(i, j, q) = |k_{AMT}(i) - k_{AM1T}(j)|$$

$$W_V(i, j, q) = \left|\left(P_{AMT}(i) + q\frac{p_A}{M}\right) - p_{AM1T}(j)\right|$$

$$W_{RV}(i, j, q) = \partial \cdot W_R(i, j, q) + \beta \cdot W_V(i, j, q)$$

wherein $\partial$ and $\beta$ are predetermined coefficients corresponding to the first weight value $W_R(i, j, q)$ and the second weight value $W_V(i, j, q)$, respectively, $p_A$ is a number of FFT points in a velocity gate, and q denotes a qth transmit channel corresponding to the target point data $T_{AMT}(i)$ to which the range unit data $k_{AMT}(i)$ and the velocity unit data $P_{AMT}(i)$ belong, among the M transmit channels; and the first weight value $W_R(i, j, q)$, the second weight value $W_V(i, j, q)$, and the third weight value $W_{RV}(i, j, q)$ correspond to predetermined decision thresholds $TH_R$, $TH_V$, $W_{min}(i)$, respectively; whether the target point data $T_{AMT}(i)$ matches with the target point data $T_{Am1T}(j)$ is determined according to the following conditions:

$$W_R(i, j, q) < TH_R,\ W_V(i, j, q) < TH_V,\ W_{RV}(i, j, q) < W_{min}(i)$$

in response to the conditions satisfied, it is determined that the target point data $T_{AMT}(i)$ matches with the corresponding target point data $T_{Am1T}(j)$; or in response to the conditions not satisfied, it is determined that the target point data $T_{AMT}(i)$ does not match with the corresponding target point data $T_{Am1T}(j)$.

5. The signal processing method according to claim 3, wherein after searching for the respective one of the target point data $T_{AMT}(i)$ corresponding to each of the target point data $T_{Am1T}(j)$ among $I_{AMT}$ of the target point data $T_{AMT}(i)$ respectively, determining the correspondence between the first echo signal and the M transmit channels based on the matching result, comprises:

determining, based on a correspondence between the target point data $T_{AMT}(i)$ and the target point data $T_{Am1T}(j)$, a transmit channel corresponding to the m1 transmit channels in the M transmit channels; and determining, based on the transmit channel corresponding to the m1 transmit channels in the M transmit channels, the correspondence between the first echo signal and the M transmit channels.

6. The signal processing method according to claim 5, wherein the method further comprises:

after determining the correspondence between the first echo signal and the M transmit channels based on the matching result, correcting the first target data according to the correspondence between the first echo signal and the M transmit channels to obtain a third target data.

7. The signal processing method according to claim 6, wherein m1 is equal to 1 and the m1 transmit channels for transmitting the second detection signal comprise a first transmit channel;

determining, based on the correspondence between the target point data $T_{AMT}(i)$ and the target point data $T_{Am1T}(j)$, the transmit channel corresponding to the m1 transmit channel in the M transmit channels, comprises:

determining, based on the correspondence between the target point data $T_{AMT}(i)$ and the target point data $T_{Am1T}(j)$, a second transmit channel corresponding to the first transmit channel in the M transmit channels; and correcting the first target data according to the correspondence between the first echo signal and the M transmit channels to obtain the third target data, comprises:

correcting the first target data according to a position of the second transmit channel in the M transmit channels to obtain the third target data.

8. The signal processing method according to claim 6, wherein the radar comprises L physical receive channels; the method further comprises:

performing a channel separation on the third target data to obtain target data corresponding to M*L virtual receive channels; and performing an angle measurement on the target based on the target data corresponding to the M*L virtual receive channels.

9. The signal processing method according to claim 8, wherein performing the angle measurement on the target comprises:

performing the angle measurement on the target by means of a Digital Beam Forming (DBF) algorithm or a Deterministic Maximum Likelihood (DML) algorithm.

10. The signal processing method according to claim 2, wherein performing the first processing on the first echo signal to obtain the first target data comprises:

performing a channel separation on the first echo signal and obtaining the first target data based on a channel separation result.

11. The signal processing method according to claim 2, wherein the first processing and/or the second processing comprises a constant false alarm rate (CFAR) detector.

12. The signal processing method according to claim 11, wherein one or both of the first processing and the second processing comprises at least one of the following processing:

an analog-to-digital conversion (ADC), a 1D-discrete Fourier transform (1D-FFT), a 2D-discrete Fourier transform (2D-FFT) and a non-coherent integration (NCI).

13. The signal processing method according to claim 2, wherein the first detection signal or the second detection signal is a frequency modulated continuous wave (FMCW) signal.

14. The signal processing method according to claim 13, wherein the first detection signal is an equally spaced Doppler-division-multiplexing (DDM) signal and the second detection signal is a time-division-multiplexing (TDM) signal.

15. The signal processing method according to claim 1, wherein the method further comprises:

performing a velocity ambiguity resolution alternately based on the first echo signal and the second echo signal.

16. The signal processing method according to claim 1, wherein the first detection signal is an equally spaced Doppler-division-multiplexing (DDM) signal and the second detection signal is a time-division-multiplexing (TDM) signal.

17. A non-transitory computer readable storage medium storing therein a computer program or instructions, which, when executed by a processor, causes the processor to implement a signal processing method, the method comprising:

transmitting, during a first transmit cycle, a first detection signal through M transmit channels;

transmitting, during a second transmit cycle that is different from the first transmit cycle, a second detection signal through m1 transmit channels in the M transmit channels, wherein m1<M, m1 and M are positive integers; and processing a first echo signal and a second echo signal to determine a correspondence between the first echo signal and the M transmit channels;

wherein the first echo signal and the second echo signal are signals generated after the first detection signal and the second detection signal are reflected by a target, respectively;

wherein transmitting the first detection signal through the M transmit channels comprises:

transmitting the first detection signal with pulses phase-stepped by $$(e-1)^{*}\frac{2*\pi}{M}$$

through an $e^{th}$ transmit channel in the M transmit channels, wherein $e\in\{1, 2, 3, \ldots, M\}$.

18. A radar, comprising a transceiver and a processor, wherein the transceiver comprises:

at least one antenna; and

M transmit channels, wherein the transceiver is configured to transmit a first detection signal through the M transmit channels during a first transmit cycle and a second detection signal through m1 transmit channels in the M transmit channels during a second transmit cycle that is different from the first transmit cycle, and to receive one or both of a first echo signal and a second echo signal; wherein m1<M, m1 and M are positive integers; and wherein the processor is configured to process the first echo signal and the second echo signal to determine a correspondence between the first echo signal and the M transmit channels;

wherein the first echo signal and the second echo signal are signals generated after the first detection signal and the second detection signal are reflected by a target, respectively;

wherein the transceiver is configured to transmit the first detection signal through the M transmit channels by:

transmitting the first detection signal with pulses phase-stepped by $$(e-1)^{*}\frac{2*\pi}{M}$$

through an $e^{th}$ transmit channel in the M transmit channels, wherein $e\in\{1, 2, 3, \ldots, M\}$.

19. A terminal, comprising the radar as claimed in claim 18.

20. The radar according to claim 18, wherein the processor is configured to process the first echo signal and the second echo signal to determine a correspondence between the first echo signal and the M transmit channels by:

performing a first processing on the first echo signal to obtain a first target data;

performing a second processing on the second echo signal to obtain a second target data;

performing a matching processing on the first target data and the second target data, and determining the correspondence between the first echo signal and the M transmit channels based on a matching result.

* * * * *